US012330271B2

(12) United States Patent
Rotem

(10) Patent No.: US 12,330,271 B2
(45) **Date of Patent: *Jun. 17, 2025**

(54) VACUUM GRIPPER

(71) Applicant: Nemo Power Tools Ltd., Hong Kong (CN)

(72) Inventor: Nimrod Rotem, San Francisco, CA (US)

(73) Assignee: Nemo Power Tools Ltd., Hong Kong (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/650,413

(22) Filed: Apr. 30, 2024

(65) Prior Publication Data

US 2024/0278388 A1 Aug. 22, 2024

Related U.S. Application Data

(63) Continuation of application No. 18/200,107, filed on May 22, 2023, now Pat. No. 11,999,030, which is a (Continued)

(30) Foreign Application Priority Data

May 8, 2018 (IL) ........................................ 259216

(51) Int. Cl.
*B25B 11/00* (2006.01)

(52) U.S. Cl.
CPC ................................. *B25B 11/007* (2013.01)

(58) Field of Classification Search
CPC ... B25B 11/007; B66C 1/0256; B66C 1/0287; B66C 1/0231; B25J 15/0616
See application file for complete search history.

(56) References Cited

U.S. PATENT DOCUMENTS 2,920,916 A 1/1960 Pagdin
3,240,525 A 3/1966 Wood
(Continued)

FOREIGN PATENT DOCUMENTS

CN 2806399 Y 8/2006
CN 201147927 Y 11/2008
(Continued)

OTHER PUBLICATIONS

International Search Report and Written Opinion mailed Aug. 28, 2019 as received in PCT/IL2019/050502.

*Primary Examiner* — Stephen A Vu
(74) *Attorney, Agent, or Firm* — Dorsey & Whitney LLP

(57) ABSTRACT

A vacuum gripper comprises a rigid base element and a loop-shaped vacuum seal element. The base element has first and second opposite sides. The seal element is attached at least indirectly to the second side and protruding therefrom in a direction away from the first side. The seal element comprises a contact surface that at least partially contacts with an object surface and an encircling surface oriented transversely to the contact surface so as to define a chamber. The seal element is elastically deformable at the contact surface to enable conforming to the object surface when pressed thereagainst. The vacuum gripper comprises an air extraction means mounted to the first side to be in fluid communication with the chamber through the base element, and configured to continuously extract air from the chamber to cause the contact surface to be urged towards and grip the object surface when pressed thereagainst.

6 Claims, 8 Drawing Sheets

Related U.S. Application Data continuation of application No. 17/859,703, filed on Jul. 7, 2022, now Pat. No. 11,691,250, which is a continuation of application No. 16/769,107, filed as application No. PCT/IL2019/050502 on May 5, 2019, now Pat. No. 11,413,727.

(56) References Cited

U.S. PATENT DOCUMENTS

| | | | | |
|---|---|---|---|---|
| 3,506,297 | A | 4/1970 | Creskoff | |
| 3,915,241 | A | 10/1975 | Bieri | |
| 4,852,926 | A | 8/1989 | Littell | |
| 5,681,022 | A | 10/1997 | Rankin | |
| 5,795,001 | A | 8/1998 | Burke | |
| 6,039,371 | A | 3/2000 | Smith | |
| 6,244,778 | B1 | 6/2001 | Chesbrough | |
| 6,279,976 | B1 | 8/2001 | Ball | |
| 6,296,426 | B1 | 10/2001 | King et al. | |
| 6,341,808 | B1 | 1/2002 | Baan et al. | |
| 6,413,022 | B1 | 7/2002 | Sarh | |
| 6,502,877 | B2 | 1/2003 | Schick et al. | |
| 7,004,521 | B2 | 2/2006 | Ishii | |
| 7,222,901 | B2 | 5/2007 | Gebauer et al. | |
| 7,267,512 | B1 | 9/2007 | Mueller | |
| 7,404,536 | B2 | 7/2008 | Kalb | |
| 7,712,807 | B2 | 5/2010 | Perlman et al. | |
| 7,963,578 | B2 | 6/2011 | Wells et al. | |
| 8,096,537 | B2 | 1/2012 | Browne et al. | |
| 8,104,809 | B1 | 1/2012 | Mayhugh | |
| 9,108,319 | B2 | 8/2015 | Kniss et al. | |
| 9,215,962 | B2 | 12/2015 | Qian | |
| 11,413,727 | B2 * | 8/2022 | Rotem | B25B 11/007 |
| 11,999,030 | B2 * | 6/2024 | Rotem | B66C 1/0231 |

FOREIGN PATENT DOCUMENTS

| | | | |
|---|---|---|---|
| CN | 203439893 | U | 2/2014 |
| CN | 105922189 | A | 9/2016 |
| CN | 205555846 | U | 9/2016 |
| CN | 106855077 | A | 6/2017 |
| CN | 206958070 | U | 2/2018 |
| CN | 207245123 | U | 4/2018 |
| DE | 3724659 | A1 | 2/1989 |
| DE | 202009004659.1 | U1 | 8/2010 |
| DE | 202009004659 | U1 | 8/2010 |
| EP | 3181027 | A1 | 6/2017 |
| GB | 1036586 | A | 7/1966 |
| WO | 0121357 | A1 | 3/2001 |
| WO | 2010110719 | A1 | 9/2010 |
| WO | 2017215163 | A1 | 12/2017 |

* cited by examiner

VACUUM GRIPPER

TECHNOLOGICAL FIELD

The present disclosure relates to grippers for gripping object surfaces, in particular to vacuum grippers.

BACKGROUND

The following are examples of publications relevant to the background of the presently disclosed subject matter: WO2010110719, U.S. Pat. Nos. 8,096,537, 7,963,578, 7,712,807, 7,404,536, 7,222,901, 6,502,877, 6,244,778, 9,108,319, 6,296,426, 3,915,241, 6,413,022, 9,215,962, and EP 3181027.

Acknowledgement of the above references herein is not to be inferred as meaning that these are in any way relevant to the patentability of the presently disclosed subject matter.

GENERAL DESCRIPTION

According to one aspect of the presently disclosed subject matter there is provided a vacuum gripper for gripping an object surface, the vacuum gripper comprising:

- a rigid base element having a first side and a second side opposite to the first side, the first and second sides defining therebetween a thickness of the rigid base element along its central axis, the second side having a central area and a periphery surrounding the central area and extending therefrom in a direction away from the central axis;
- a loop-shaped vacuum seal element attached at least indirectly to the periphery of the second side of the base element via an attachment surface of the vacuum seal element and having a protruding portion protruding from the second side of the base element in a direction along said axis and away from the first side of the base element, along the entire extension of the attachment surface, the protruding portion defining with said central area a chamber and comprising a contact surface configured to be brought into at least a partial contact with said object surface; and wherein the vacuum seal element is elastically deformable at least at its contact surface to enable the contact surface to conform to the object surface when pressed thereagainst; and
- an air extraction means mounted to the first side of the base element so as to be in fluid communication with said chamber through the base element, and configured to continuously extract air from the chamber to cause the contact surface to be urged towards and thereby grip the object surface when pressed thereagainst.

Due to the above features of a vacuum gripper, the contact surface of its vacuum seal element as well as the entire protruding portion thereof can have any desired radial extension and can be fully and securely supported during a gripping action. Consequently, the gripping ability of the vacuum gripper can be essentially increased allowing it to be used for picking up, support, hold, place and release relatively bulky and/or heavy items such as boxes, pieces of furniture, panels and other heavy, bulky, fragile or difficult to grip items.

All additional features and aspects as well as embodiments of vacuum grippers of the presently disclosed subject matter presented below, each separately and in any combination, facilitate the above improved gripping ability of the vacuum grippers, while allowing them to have a compact and friendly design.

The periphery of the second side of the base element can be bounded by a peripheral rim radially spaced thereby from said central area and the vacuum seal element can be at least indirectly mounted to the base element via its attachment surface at an area of the periphery between the peripheral rim and the central area. The peripheral rim can constitute a lateral boundary of the gripper and the entire protruding portion or at least its substantial majority can be disposed within this lateral boundary of the gripper defined by the peripheral rim.

Thus, according to another aspect of the presently disclosed subject matter there is provided a vacuum gripper for gripping an object surface, the vacuum gripper comprising, prior to its being brought into contact with the object surface:

- a rigid base element having two opposite sides, the second side having a central area and a periphery surrounding the central area; the periphery having a peripheral rim defining a lateral boundary of the gripper;
- a loop-shaped vacuum seal element having an attachment surface, via which it is attached at least indirectly to the periphery of the second side of the rigid base element, and a protruding portion free of contact with the base element and protruding in a direction away from the first side of the rigid base element so that at least a majority thereof is disposed within said boundary; the protruding portion comprising a contact surface configured to be brought into at least a partial contact with said object surface; the vacuum seal element being elastically deformable at least at its contact surface to enable the contact surface to conform to the object surface when pressed thereagainst;
- a chamber defined the protruding portion with said central area of the second side of the base element; and
- an air extraction means mounted to the first side of the base element so as to be in fluid communication with said chamber through the base element, and configured to continuously extract air from the chamber to cause the contact surface to be urged towards and thereby grip the object surface when pressed thereagainst.

In the above aspects, the protruding portion of the vacuum seal element can have an inner encircling surface and an outer encircling surface both extending between the contact surface and the attachment surface; the inner encircling surface being oriented transversely to the contact surface and facing in the direction of said central area and the chamber and the outer encircling surface being oriented transversely to the contact surface and facing in the direction away from said central area and the chamber. In this case, the outer encircling surface can be disposed closer to the chamber than the peripheral rim of the second side of the rigid base element to the central area.

The attachment surface of the vacuum seal element and a corresponding peripheral support area of the base element can extend along at least a majority of the the periphery of second side of the base element between the central area and the peripheral rim.

The contact surface of the vacuum seal element can be substantially co-extensive with the attachment surface along the periphery of the second side of the base surface.

The vacuum seal element can have a thickness of its protruding portion between the inner and outer encircling surfaces thereof, which meets at least one of the following conditions:

- it is at least not smaller than a predetermined distance to which the protruding portion protrudes from the second side of the rigid base element;

it is at least not smaller than a radial extension of the attachment surface (i.e. its extension in the direction along the periphery of the second side of the vacuum seal element and away from the central axis).

The thickness of the protruding portion meeting at least one of the above conditions is a thickness at least proximate and/or adjacent the contact surface. Optionally this thickness is a thickness along a majority of said predetermined distance, to which the protruding portion of the vacuum seal element protrudes from the base element. Optionally, this thickness is a thickness along the entire predetermined distance.

The vacuum gripper can have a channel at which the vacuum seal element is at least indirectly mounted to the periphery of the second side of the rigid base element, via an attachment portion of the vacuum seal element comprising the attachment surface, the channel being open in the direction along the central axis and away from the first side of the rigid base element and being configured to receive therein said attachment portion. The channel can be configured to conform to the attachment portion, i.e. to have a shape and dimensions corresponding to those of the attachment portion. In this case, the attachment portion can contact the channel not only along the attachment surface but along its entire exterior, i.e. at all its surfaces disposed within the channel. These surfaces can include the entire attachment surface and those parts of the inner and outer encircling surfaces which are disposed within the channel.

There is thus provided according to a further aspect of the presently disclosed subject matter a vacuum gripper for gripping an object surface, the vacuum gripper comprising, prior to its being brought into contact with the object surface;

- a rigid base element having first and second opposite sides, the second side having a central area with a central axis passing through both sides and a periphery surrounding the central area; the periphery having a channel of a width extending radially along the second side of the element and a depth extending axially in a direction towards the first side of the element;
- a loop-shaped vacuum seal element having an attachment portion received within said channel for mounting the vacuum seal element to the rigid base element and a protruding portion free of contact with the base element and protruding from said channel along its entire width in a direction away from the first side of the rigid base element; the protruding portion comprising a contact surface configured to be brought into at least a partial contact with said object surface; the vacuum seal element being elastically deformable at least at its contact surface to enable the contact surface to conform to the object surface when pressed thereagainst;
- a chamber defined by the protruding portion with said central area of the second side of the base element; and
- an air extraction means mounted to the first side of the base element so as to be in fluid communication with said chamber through the base element, and configured to continuously extract air from the chamber to cause the contact surface to be urged towards and thereby grip the object surface when pressed thereagainst.

The terms "rigid" and "deformable" as used herein are relative terms, such that the base element is understood to be rigid compared to the deformable vacuum seal element.

Since the vacuum seal element is elastically deformable at least at its contact surface to enable the contact surface to conform to the object surface when pressed thereagainst, it is possible for the vacuum gripper to achieve a grip on textured surfaces where the surface texture would otherwise allow air leakage.

Since the air extraction means is configured to continuously extract air from the chamber, if any air leakage does occur, an effective vacuum status can be maintained and grip on the object surface will not be lost as a result.

The vacuum seal element can comprise at least one of silicone, rubber and closed-cell foam. Such materials are capable of flexibility sufficient to conform to a textured surface to prevent or mitigate air leakage due to the non-smooth nature of textured surfaces. Of course, it is to be understood that such materials are also suitable for use on smooth surfaces in addition to textured surfaces. Closed-cell foams do not have significantly connected cells in the foam, therefore there is no passageway for leakage of air through the foam. Such foams can achieve high compressibility (for example, compression of up to 75% of the foam's thickness), allowing the ability to conform with the shape of an object surface. Furthermore, since the cells are closed, air is trapped inside each of the cells. Therefore the compression in the foam is stored in a manner similar to a non-linear spring. Properties of the foam, such as the cell size, thickness of the cell walls, as well as dimensions of the foam can be selected to be suitable for the weight, size and texture of objects to be lifted.

The air extraction means can comprise an impeller or a pump, each of which separately and in combination can be further referred as air extraction mechanism. The pump or impeller can be configured to be operated in a steady or variable manner. The pump or impeller is operated in such a manner as to ensure that the vacuum which allows the gripping to occur is not lost. Thus for some textured surfaces, or in some cases, steady operation can be desirable, while in others, such as with smoother surfaces, light objects which can need to be lifted, and/or where energy savings might be achieved, a variable operation can be desirable. By "variable", what is meant is fluctuation in operating power, which can also include pulsed or intermittent operation. In the present specification, The vacuum gripper can be a portable or hand-held vacuum gripper. The air extraction means can further comprise a power source. The power source can comprise a battery pack. By enabling a hand-held or portable vacuum gripper to have its own power source, there is no need for a mains connection or other wired power connection which could otherwise constitute a trip-hazard in many circumstances. Thus the vacuum gripper can accommodate use in many environments more safely and easily.

At least one of the power source and the air extraction mechanism can be disposed on the first side of the base element. Since at least one of the power source and air extraction mechanism can be disposed on the first side of the base element, a more compact arrangement can be achieved.

The vacuum gripper can comprise a handle for holding the vacuum gripper. The handle can extend along a longitudinal direction of the rigid base element, and be mounted to its first side at locations spaced apart in the longitudinal direction. For example, the handle can have a graspable handle section extending along the length of the first side of the rigid base element and two handle mounting sections oriented transversely to the graspable section and engaging the first side of the rigid base element.

Thus, according to still further aspect of the presently disclosed subject matter, there is provided a vacuum gripper for gripping an object surface, the vacuum gripper comprising, prior to its being brought into contact with the object surface:

a rigid base element having a first side and a second side opposite to the first side, the second side having a central area and a periphery;

a loop-shaped vacuum seal element having an attachment surface at which it is attached at least indirectly to said periphery of the second side of the base element and a protruding portion free of contact with the base element and protruding therefrom in a direction away from the first side of the base element; the protruding portion of the vacuum seal element comprising a contact surface configured to be brought into at least a partial contact with said object surface, the protruding portion define with the central area a chamber; the vacuum seal element being elastically deformable at least at its contact surface to enable the contact surface to conform to the object surface when pressed thereagainst;

a handle assembly having a graspable handle section and two spaced apart handle mounting sections oriented transversely to the graspable section and integrally connected to the first side of the rigid basic element; and an air extraction means housed in the handle assembly at least partially within the handle mounting sections, in fluid communication with said chamber through the base element, the air extraction means being configured to continuously extract air from the chamber to cause the contact surface to be urged towards and thereby grip the object surface when pressed thereagainst.

Thus, a compact arrangement of the vacuum gripper can be achieved when different components of the air extraction means are housed within different parts of the handle assembly. The two handle mounting sections can be used for housing at least partially most of the components of the air extraction means.

In all the above aspects and embodiments, the vacuum gripper can comprise a bracing structure protruding from the second side of the base element to a lesser extent than that of the protruding portion of the vacuum seal element, and made of a material which is more rigid than that of the vacuum seal element; wherein the bracing structure extends at least along a part of the protruding portion of the vacuum seal element. Since the bracing structure protrudes from the base element to a lesser extent than that of protruding portion of the vacuum seal element, the vacuum seal element will be the first component to contact an object surface. Since the bracing structure is made of a material which is more rigid than that of the vacuum seal element, the vacuum seal element will initially deform in a manner to conform to an object surface, and subsequently, the bracing structure will provide sufficient support, stiffness and structure to prevent over-compression of the vacuum seal element.

Thus, according to a still further aspect of the presently disclosed subject matter, there is provided A vacuum gripper for gripping an object surface, the vacuum gripper comprising:

a rigid base element having a first side and a second side opposite to the first side, the second side having a central area and a periphery surrounding the central area;

a loop-shaped vacuum seal element having an attachment surface at which it is attached to the periphery of the second side of the base element and a protruding portion protruding therefrom in a direction away from the first side of the base element, along an entire extension of the attachment surface, so as to define a chamber with the central area of the second side of the rigid base element; the vacuum seal element comprising a contact surface configured to be brought into at least a partial contact with said object surface and an inner and an outer encircling surface both extending between the attachment surface and the contact surface, the inner encircling surface facing in a direction towards the central area and the chamber and the outer encircling surface facing in a direction away from the central area and the chamber; the vacuum seal element being elastically deformable at least at its contact surface to enable the contact surface to conform to the object surface when pressed thereagainst and grip the object surface when air is extracted from said chamber; and a bracing structure attached to the periphery of the second side of the base element and protruding therefrom in a direction away from the first side of the base element to a lesser extent than that of the protruding portion of the vacuum seal element; the bracing structure is made of a material which is more rigid than that of the vacuum seal element; and wherein the bracing structure extends at least along a part of the vacuum seal element.

Said bracing structure can be made of a material which is less rigid than that of the base. Since the bracing structure is made of a material which is less rigid than that of the base element, the bracing structure will be capable of some small amount of deformation and thus will not damage the object surface. Conversely, the relatively more rigid base element will provide structural integrity to the chamber.

Said bracing structure can have a loop shape. With this arrangement, support for the entire length of the vacuum seal element can be provided. Conversely, the bracing structure can have an intermittent shape. Such a shape can allow more flexibility in the deformability of the vacuum seal structure.

The bracing structure can be disposed closer to the central area of the second side than to a peripheral rim thereof. In this arrangement, the bracing structure can be concealed inside the chamber. Alternatively, the bracing structure can be disposed closer to the periphery of the second side than to the central area thereof. In this arrangement, the bracing structure can be visible outside of the chamber and so it will be possible to know once the maximum possible deformation and thus the maximum possible vacuum have been achieved and strongest grip has been formed between the vacuum gripper and an object surface.

The bracing structure can comprise at least one of rubber, silicone and closed-cell foam. Such materials can allow flexibility while maintaining a high structural integrity and rigidity.

In all the above aspects and embodiments, the vacuum seal element can be made at least partially of a closed-cell foam material.

Thus, according to a still further aspect of the present disclosure, there is provided a vacuum gripper for gripping an object surface, the vacuum gripper comprising:

a rigid base element having a first side and a second side opposite to the first side, the second side having a central area and a periphery surrounding the central area; and a loop-shaped vacuum seal element comprising a closed-cell foam material and having an attachment surface at which it is attached to the periphery of the second side of the base element and a protruding portion protruding therefrom in a direction away from the first side of the base element, along an entire extension of the attachment surface, so as to define a chamber with the central area of the second side of the rigid base element; the vacuum seal element comprising a contact surface configured to be brought into at least a partial contact with said object surface and an inner and an outer encircling surface both extending between the attachment surface and the contact surface, the inner surface facing in a direction towards the central area and the chamber and the outer surface facing in a direction away from the central area and the chamber; the vacuum seal element being elastically deformable at least at its contact surface to enable the contact surface to conform to the object surface when pressed thereagainst and grip the object surface when air is extracted from said chamber.

The vacuum gripper according to any one of the above aspects as well as any one of the exemplary embodiments listed below, can have any one or more features of the vacuum gripper according to the other aspects and embodiments.

The following are non-limiting examples of different embodiments of the presently disclosed subject matter:

1. A vacuum gripper for gripping an object surface, the vacuum gripper comprising, prior to its being brought into contact with the object surface:
   - a rigid base element having a first side and a second side opposite to the first side, the second side having a central area and a periphery surrounding the central area;
   - a loop-shaped vacuum seal element having:
     - an attachment surface, at which it is mounted at least indirectly to the periphery of the second side of the rigid base element;
     - a protruding portion free of contact with the rigid base element and protruding therefrom, along an entire extension of the attachment surface, in a direction away from the first side of the base element;
     - a contact surface constituting a part of the protruding portion and configured to be brought into at least a partial contact with said object surface, the vacuum seal element being elastically deformable at least at the contact surface to enable the contact surface to conform to the object surface when pressed thereagainst; and
     - an inner encircling surface facing in a direction towards the central area and an outer encircling surface facing in a direction away from the inner encircling surface, both surfaces extending between the contact and the attachment surfaces;
   - a chamber defined by the protruding portion with said central area at the second side of the rigid base element; and
   - an air extraction means mounted to the first side of the base element so as to be in fluid communication with said chamber through the base element, and configured to continuously extract air from the chamber to cause the contact surface to be urged towards and thereby grip the object surface when pressed thereagainst.
2. A vacuum gripper according to embodiment 1, wherein the protruding portion protrudes from the second side of the rigid base element to a pre-determined distance and has a thickness between the inner and outer encircling surfaces which is at least not smaller than the predetermined distance and/or which is not smaller than the thickness of the vacuum seal element between the inner and outer encircling surfaces at the attachment surface thereof, at least along a part of the predetermined distance, optionally at least along a majority of the predetermined distance, and further optionally along the entire predetermined distance.
3. A vacuum seal element according to embodiment 1 or 2, wherein said periphery of the second side of the rigid base element is bounded by a peripheral rim and comprises a peripheral support area at which the attachment surface of the vacuum seal element is attached to the periphery of the second side of the rigid base element.
4. A vacuum gripper according to embodiment 3, wherein the peripheral support area constitutes a majority of the periphery of the second side of the rigid base element.
5. A vacuum gripper according to embodiment 3 or 4, wherein at least a majority of the protruding portion of the vacuum seal element is disposed within a lateral boundary defined by the peripheral rim.
6. A vacuum gripper according to any one of the preceding embodiments, wherein the vacuum seal element is mounted to the second side of the vacuum seal element via a channel receiving an attachment portion of the vacuum seal element comprising its attachment surface, the protruding portion protruding from the channel along the entire extension of the attachment portion.
7. A vacuum gripper according to embodiment 6, wherein the channel is formed by at least one additional element other than the rigid element, mounted to the second side of the rigid base element.
8. A vacuum gripper according to embodiment 7 when dependent on embodiment 3 directly or indirectly, wherein said at least one additional element is attached to the second side of the rigid base element along the periphery thereof between the peripheral rim and the central area.
9. A vacuum gripper according embodiment 7, wherein said channel is bounded on one side thereof by said rim and on the other side thereof opposite the peripheral rim by a wall constituting a part of said additional element.
10. A vacuum gripper according to any one of embodiments 6 to 9, wherein the channel has a width corresponding to the thickness of the attachment portion between the corresponding parts of the inner and outer encircling surfaces disposed within the channel and a depth corresponding to a height of the attachment portion along said parts the inner and outer encircling surfaces, the protruding portion protruding from said channel along its entire width.
11. A vacuum gripper according to embodiment 10, wherein the channel meets one of the following conditions:
    - the width of the channel does not exceed the thickness of the protruding portion; or
    - the contact surface is co-extensive with the channel along the entire width thereof;
    - where the periphery of the second side of the vacuum seal element is bounded by a peripheral rim, the peripheral rim constitutes one wall of the channel.
12. A vacuum gripper according to any one of the preceding embodiments, being a portable or hand-held vacuum gripper.
13. A vacuum gripper according to embodiments 12, further comprising a handle for holding the vacuum gripper at the first side of the base element.

14. A vacuum gripper according to embodiment 13, wherein the handle is connected to the first side of the rigid base element at at least two spaced apart locations.
15. A vacuum gripper according to embodiment 14 when dependent on embodiment 3 or any one of the embodiments dependent on embodiment 3 directly or indirectly, wherein said locations are disposed closer to the peripheral rim than to the central area.
16. A vacuum gripper according to embodiment 14 or 15, wherein the handle comprises two handle mounting sections integrally connected to the first side of the rigid base element at said spaced apart locations and a graspable handle section extending therebetween.
17. A vacuum gripper according to embodiment 16, wherein the air extraction means comprises a power source, which is optionally mounted at least partially within the handle, optionally within one of the handle mounting sections.
18. A vacuum gripper according to embodiment 16 or 17, wherein the air extraction means comprises an air extraction mechanism such as an impeller or a pump, which is optionally mounted within the handle, optionally within one of the handle mounting sections.
19. A vacuum gripper according to embodiment 18 when dependent on embodiment 14, wherein both the power source and the air extraction mechanism are at least partially housed in the two handle mounting portions, optionally in two different handle mounting portions.
20. A vacuum gripper according to any one of the preceding embodiments, further comprising at least one bracing structure and protruding from the second side of the base element to a lesser extent than that of the vacuum seal element, and made of a material which is more rigid than that of the vacuum seal element; wherein the bracing structure extends along a part of the periphery which is free of contact with the vacuum seal element.
21. A vacuum gripper according to embodiment 20, wherein said bracing structure is made of a material which is less rigid than that of the base element.
22. A vacuum gripper according to embodiment 20 or 21, wherein said bracing structure has a loop shape.
23. A vacuum gripper according to embodiment 20, 21 or 22, when dependent on embodiment 3 or any one of the embodiments dependent on embodiment 3 directly or indirectly, wherein at least a part of the bracing structure is disposed closer to the central area of the second side than to the peripheral rim thereof.
24. A vacuum gripper according to embodiment 20, 21 or 22, when dependent on embodiment 3 or any one of the embodiments dependent on embodiment 3 directly or indirectly, wherein at least a part of the bracing structure is disposed closer to the peripheral rim than to the central area.
25. A vacuum gripper according to any of embodiments 20 to 24, wherein the bracing structure comprises at least one of rubber, silicone and closed-cell foam.
26. A vacuum gripper for gripping an object surface, the vacuum gripper comprising, prior to its being brought into contact with the object surface:
   a rigid base element having two opposite sides, the second side having a central area and a periphery surrounding the central area and bounded by a peripheral rim;
   a loop-shaped vacuum seal element having an attachment surface, at which it is mounted at least indirectly to the periphery of the second side of the rigid base element, and a protruding portion free of contact with the base element and protruding in a direction away from the first side of the rigid base element so that at least a majority thereof is disposed within a lateral boundary defined by the peripheral rim; the protruding portion comprising a contact surface configured to be brought into at least a partial contact with said object surface; the vacuum seal element being elastically deformable at least at its contact surface to enable the contact surface to conform to the object surface when pressed thereagainst;
   a chamber defined the protruding portion with said central area of the second side of the base element; and
   an air extraction means mounted to the first side of the base element so as to be in fluid communication with said chamber through the base element, and configured to continuously extract air from the chamber to cause the contact surface to be urged towards and thereby grip the object surface when pressed thereagainst.
27. A vacuum gripper according to embodiment 23, wherein the vacuum seal element has an inner encircling surface and an outer encircling surface both extending between the contact surface and the attachment surface; the inner encircling surface facing towards said central area and said chamber and the outer encircling surface facing away from said central area and said chamber.
28. A vacuum gripper according to embodiment 24, wherein the protruding portion protrudes from the second side of the rigid base element to a pre-determined distance and has a thickness between the inner and outer encircling surfaces at least along a part of the predetermined distance, optionally at least along a majority of the predetermined distance, which is at least not smaller than the predetermined distance and/or at least not smaller than the thickness of the vacuum seal element at its attachment surface.
29. A vacuum gripper according to any one of embodiments 23 to 25, further comprising a handle for holding the vacuum gripper at the first side of the base element.
30. A vacuum gripper according to embodiment 26, wherein the handle comprising two handle mounting portions connected to the first side of the rigid base element at two spaced apart locations.
31. A vacuum gripper according to embodiment 27, wherein said locations are disposed adjacent the peripheral rim of the rigid base element.
32. A vacuum gripper according to embodiment 27 or 28, wherein the air extraction means are housed at least partially in the handle mounting portions.
33. A vacuum gripper for gripping an object surface, the vacuum gripper comprising, prior to its being brought into contact with the object surface:
   a rigid base element having a first side and a second side opposite to the first side, the second side having a central area and a periphery surrounding the central area;
   a loop-shaped vacuum seal element having an attachment surface at which it is attached at least indirectly to the periphery of second side of the base element and a protruding portion free of contact with the base element and protruding therefrom in a direction away from the first side of the base element; the protruding portion of the vacuum seal element comprising a contact surface configured to be brought into at least a partial contact with said object surface, the contact surface and the attachment surface extending between an inner encircling surface facing in a direction of the central area and an outer encircling surface facing in a direction away from the inner encircling surface; the vacuum seal element being elastically deformable at least at its contact surface to enable the contact surface to conform to the object surface when pressed thereagainst;

a chamber defined by the protruding portion with the central area of the rigid base element;

a handle assembly having a graspable handle section and two handle mounting sections oriented transversely to the graspable section, via which the handle is connected to the first side of the rigid base element; and an air extraction means housed at least partially within the handle mounting sections, in fluid communication with said chamber through the base element, the air extraction means being configured to continuously extract air from the chamber to cause the contact surface to be urged towards and thereby grip the object surface when pressed thereagainst.

34. A vacuum gripper according to embodiment 30, wherein the two mounting sections are connected to the first side of the rigid base element at two locations spaced apart along a length of the rigid base element.

35. A vacuum gripper according to embodiment 31, wherein the periphery of the second side of the rigid base element is bounded by a peripheral rim and said locations are disposed adjacent the peripheral rim of the rigid base element.

36. A vacuum gripper according to embodiment 30, 31 or 32, wherein the air extraction means comprises a power source.

37. A vacuum gripper according to embodiment 33, wherein the power source is mounted at least partially within the handle, optionally within one of the handle mounting sections.

38. A vacuum gripper according to any one of embodiments 30 to 34, wherein the air extraction means comprises an air extraction mechanism, optionally a pump or an impeller, which is optionally mounted within the handle, optionally within one of the handle mounting sections.

39. A vacuum gripper according to embodiment 35, wherein both the power source and the air extraction mechanism are at least partially housed in the two handle mounting portions, optionally in two different handle mounting portions.

40. A vacuum gripper according to any one of embodiments 23 to 36, further comprising a channel constituting a portion of the periphery of the second side of the rigid base element and receiving an attachment portion of the vacuum seal element which comprises the attachment surface and parts of the inner and outer encircling surfaces disposed within the channel, the channel having a channel width corresponding to a thickness of the attachment portion between said parts of the inner and outer encircling surfaces and a channel depth corresponding to a height of the attachment portion along its parts of inner and outer encircling surfaces, the protruding portion protruding from the cannel along the entire width thereof.

41. A vacuum gripper for gripping an object surface, the vacuum gripper comprising, prior to its being brought into contact with the object surface:

a rigid base element having two opposite sides, the second side having a central area and a periphery surrounding the central area; the periphery having a channel of a width along the second side of the element and a depth extending in a direction towards the first side of the element;

a loop-shaped vacuum seal element having an attachment portion received within said channel, by virtue of which the vacuum seal element is mounted to the rigid base element, and a protruding portion free of contact with the base element and protruding from said channel, along its entire width, in a direction away from the first side of the rigid base element; the protruding portion comprising a contact surface configured to be brought into at least a partial contact with said object surface; the vacuum seal element being elastically deformable at least at its contact surface to enable the contact surface to conform to the object surface when pressed thereagainst;

a chamber defined the protruding portion with said central area of the second side of the base element; and an air extraction means mounted to the first side of the base element so as to be in fluid communication with said chamber through the base element, and configured to continuously extract air from the chamber to cause the contact surface to be urged towards and thereby grip the object surface when pressed thereagainst.

42. A vacuum gripper according to any one of embodiments 38, wherein the width of the channel does not exceed the thickness of the protruding portion.

43. A vacuum gripper according to embodiment 38 or 39, wherein the contact surface is co-extensive with the channel along the entire width thereof.

44. A vacuum gripper according to any one of embodiments 37 to 40, wherein the periphery of the second side of the vacuum seal element is bounded by a peripheral rim which is spaced thereby from the central area, and wherein the channel is disposed adjacent the peripheral rim, and wherein optionally, the peripheral rim constitutes one wall of the channel.

45. A vacuum gripper according to any one of embodiments 37 to 40, wherein the periphery of the second side of the vacuum seal element is bounded by a peripheral rim which is spaced thereby from the central area, and wherein the channel is disposed adjacent the peripheral rim, and wherein optionally, the peripheral rim constitutes one wall of the channel.

46. A vacuum gripper according to any one of embodiments 38 to 41, wherein the channel is formed by at least one additional element other than the rigid element, mounted to the second side of the rigid base element.

47. A vacuum gripper according to embodiment 42 when dependent on embodiment 41, wherein said at least one additional element is attached to the second side of the rigid base element along the periphery thereof between the peripheral rim and the central area.

48. A vacuum gripper according embodiment 42 or 43, wherein said channel is bounded on one side thereof by said rim and on the other side thereof opposite the peripheral rim by a wall constituting a part of said additional element.

49. A vacuum gripper according to any one of the preceding embodiments, wherein the vacuum seal element comprises a closed-cell material.

BRIEF DESCRIPTION OF THE DRAWINGS

In order to better understand the subject matter that is disclosed herein and to exemplify how it can be carried out in practice, embodiments will now be described, by way of non-limiting example only, with reference to the accompanying schematic drawings, in which.

DETAILED DESCRIPTION OF EMBODIMENTS

A vacuum gripper is a device suitable for gripping an object at an object surface due to a vacuum which is created between the vacuum gripper and the object surface.

Figure 1:
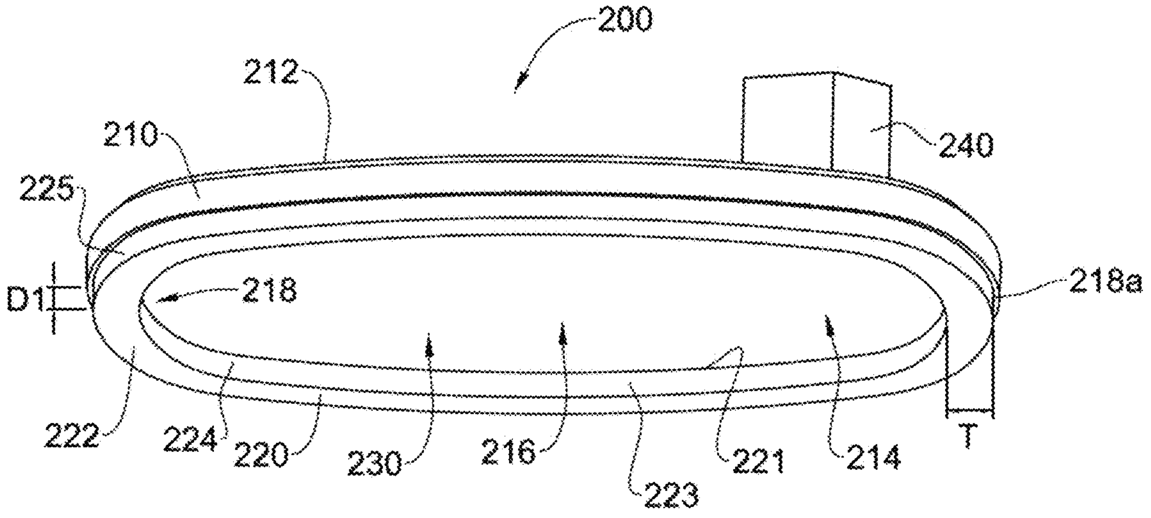
FIG. 1 shows a bottom perspective view of a vacuum gripper according to one example of the presently disclosed subject matter.

According to one example, as schematically shown in FIG. 1, a vacuum gripper 200 comprises a rigid base element 210 having a first side 212 and a second side 214 opposite to the first side 212. The second side 214 has a central area 216 and a periphery 218 surrounding the central area 216. The periphery 218, which is seen only partially, is bounded by a peripheral rim 218*a* radially spaced thereby from the central area.

The vacuum gripper 200 further comprises a loop-shaped vacuum seal element 220 attached with an attachment surface 221 thereof to the periphery 218 along a peripheral support area 218*b* (not seen).

The loop-shaped vacuum seal element 220 further comprises a protruding portion 223 which is free of contact with the base element 210 and which protruding from the second side 214 of the base element 210 in a direction away from the first side 212 of the base element 210 to a predetermined distance D1.

The protruding portion 223 of the vacuum seal element 220 comprises a contact surface 222 configured to be brought into at least a partial contact with an object surface. The vacuum seal element 220 also comprises an inner encircling surface 224 oriented transversely to and extending from the contact surface 222 and facing towards the central area 216 so as to define therewith a chamber 230 along the protruding portion 223. The vacuum seal element 220 also comprises an outer encircling surface 225 oriented transversely to and extending from the contact surface 222 and facing away from the central area 216 and the chamber 230, the peripheral rim 218*a* of the second side of the base element protruding outwardly from the outer encircling surface.

Thus, the contact surface 222 and the attachment surface 221 of the vacuum seal element both extend between the inner and outer encircling surfaces 224 and 225. As can be understood from FIG. 1, in this example the contact surface 222 is co-extensive with the attachment surface 221 along the periphery of the second side of the base element.

As further seen in FIG. 1, the predetermined distance D, to which the protruding portion 223 protrudes from the second side of the rigid base element, does not exceed a thickness T of the protruding portion between the inner and outer encircling surfaces. More particularly, the thickness T of the protruding portion is greater than the predetermined distance D1.

The vacuum seal element 220 is elastically deformable at least at its contact surface 222 to enable the contact surface 222 to conform to an object surface when pressed thereagainst. The vacuum gripper 200 further comprises an air extraction means 240 mounted to the first side 212 of the base element 210 so as to be in fluid communication with the chamber 230 through the base element 210. The air extraction means 240 is configured to continuously extract air from the chamber to cause the contact surface 222 to be urged towards and thereby grip an object surface when pressed thereagainst.

Figure 2:
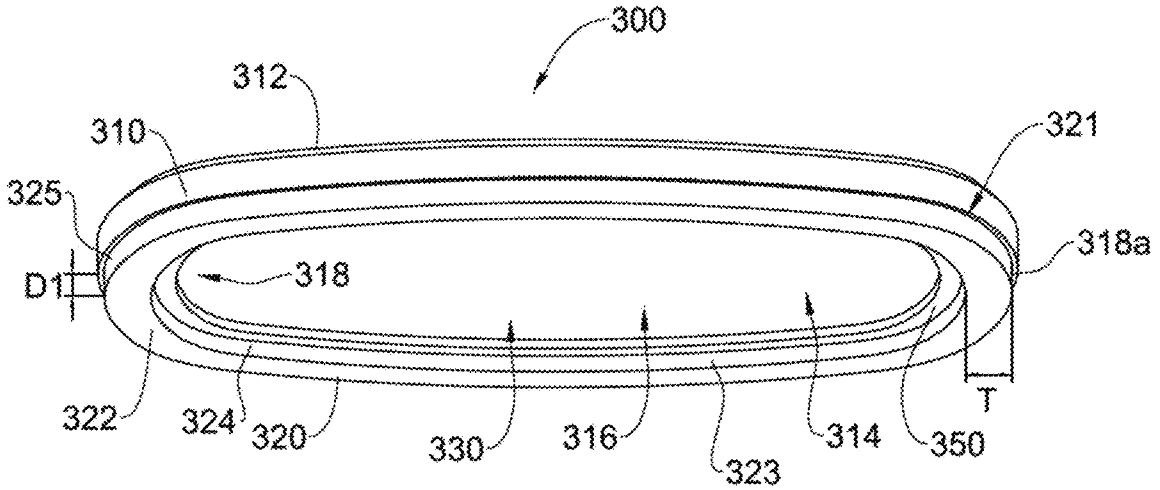
FIG. 2 shows a bottom perspective view of a vacuum gripper according to a second example of the presently disclosed subject matter.

According to a further example, as shown in FIG. 2, a vacuum gripper 300 comprises a rigid base element 310 having a first side 312 and a second side 314 opposite to the first side 312. The second side 314 has a central area 316 and a periphery 318 surrounding the central area 316 and bounded by a peripheral rim 318*a*.

The vacuum gripper 300 further comprises a loop-shaped vacuum seal element 320 attached to the periphery of the second side 314 of the base element 310 with an attachment surface 321 thereof along a peripheral support area 318*b* (not seen).

The loop-shaped vacuum seal element 320 comprises a protruding portion 323 free of contact with the base element 310 protruding from the second side 314 of the base element 310 in a direction away from the first side 312 of the base element 310 to a predetermined distance D1. The protruding portion 323 of the vacuum seal element 320 comprises a contact surface 322 configured to be brought into at least a partial contact with an object surface. The vacuum seal element 320 also comprises an inner encircling surface 324 oriented transversely to and extending from the contact surface 322 and at least partially facing towards the central area 316 so as to define therewith a chamber 330 along the protruding portion 323. The vacuum seal element 320 also comprises an outer encircling surface 325 oriented transversely to and extending from the contact surface 322 and facing away from the central area 316 and the chamber 330, the peripheral rim 318*a* of the second side of the base element protruding outwardly from the outer encircling surface. Thus, the contact surface 322 and the attachment surface 321 of the vacuum seal element both extend between the inner and outer encircling surfaces 324 and 325. As can be understood from FIG. 2, the contact surface 322 is co-extensive with the attachment surface 321 along the periphery of the second side of the base element.

As further seen in FIG. 2, the predetermined distance D1, to which the protruding portion 323 protrudes from the second side of the rigid base element, does not exceed a thickness T of the protruding portion between the inner and outer encircling surfaces. More particularly, the thickness T of the protruding portion is greater than the predetermined distance D1.

The vacuum seal element 320 is elastically deformable at least at its contact surface 322 to enable the contact surface 322 to conform to an object surface when pressed thereagainst. The vacuum gripper 300 further comprises a bracing structure 350 attached to the peripheral support area 318*b* (not seen) of the second side 314 of the base element 310 and protruding therefrom in a direction away from the first side 312 of the base element to a lesser extent than that of the vacuum seal element 320. The bracing structure 350 is made of a material which is more rigid than that of the vacuum seal element 320. The bracing structure 350 extends at least along a part of the vacuum seal element 320.

Figure 3:
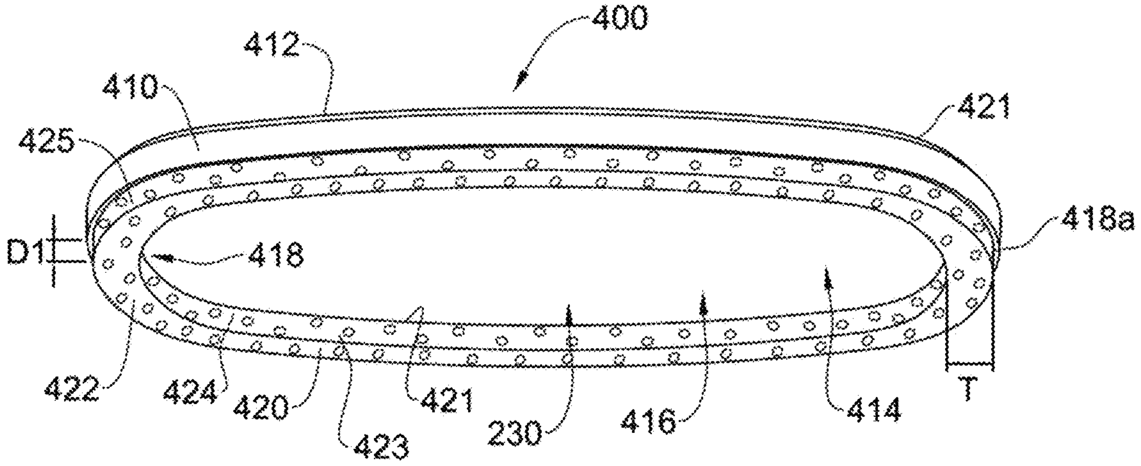
FIG. 3 shows a bottom perspective view of a vacuum gripper according to a still further example of the presently disclosed subject matter.

According to a still further example, as shown in FIG. 3, a vacuum gripper 400 comprises a rigid base element 410 having a first side 412 and a second side 414 opposite to the first side 412. The second side 414 has a central area 416 and a periphery 418 surrounding the central area 416 and bounded by a peripheral rim 418*a* radially spaced thereby from the central area.

The vacuum gripper 400 further comprises a loop-shaped vacuum seal element 420 attached to the peripheral support area 418*b* of the second side 414 of the base element 310 with an attachment surface 421 thereof at a peripheral support area 418*b* (not seen).

As can be seen in FIG. 3, the loop-shaped vacuum seal element 420 is attached to the second side 414 of the base element 410. The loop-shaped vacuum seal element 420 comprises a protruding portion 423 free of contact with the base element protruding from the second side 414 of the base element 410 in a direction away from the first side 412 of the base element 410 to a predetermined distance D1. The protruding portion 423 of the vacuum seal element 420 comprises a contact surface 422 configured to be brought into at least a partial contact with an object surface. The vacuum seal element 420 also comprises an inner encircling surface 424 oriented transversely to and extending from the contact surface 422 and at least partially facing towards the central area 416 so as to define therewith a chamber 430 along the protruding portion 423. The vacuum seal element 420 also comprises an outer encircling surface 425 oriented transversely to and extending from the contact surface 422 and facing away from the central area 416 and the chamber 430, the peripheral rim 418*a* of the second side of the base element protruding outwardly from the outer encircling surface. Thus, the contact surface 422 and the attachment surface 421 of the vacuum seal element both extend between the inner and outer encircling surfaces 424 and 425. As can be understood from FIG. 3, the contact surface 422 is co-extensive with the attachment surface 421 along the periphery of the second side of the base element.

As further seen in FIG. 3, the predetermined distance D1, to which the protruding portion 323 protrudes from the second side of the rigid base element, does not exceed a thickness T of the protruding portion between the inner and outer encircling surfaces. More particularly, the thickness T of the protruding portion is greater than the predetermined distance D1.

The vacuum seal element 420 is elastically deformable at least at its contact surface 422 to enable the contact surface 422 to conform to an object surface when pressed thereagainst. The vacuum seal 420 element comprises a closed-cell foam material.

An exemplary closed-cell foam material can be formed, for example, from Styrene, 1,3-butadiene polymer, also known as: Benzene, ethenyl-, polymer with 1,3-butadiene; Butadiene-styrene latex; Butadiene-styrene resin; Poly(styrene-co-butadiene), 5% styrene; Styrene, 1,3-butadiene polymer; Styrene-Butadiene copolymer; Styrene-butadiene copolymers; and having the following properties:

- CAS (Chemical Abstract Service) Registry Number: 9003-55-8
- Molecular Formula: C121114
- Molecular Weight: 158.243
- Density: 1.04 g/mL at 25° C.
- Solubility: solvents with solubility parameters between 7.7 and 9.4: soluble
- Form: slab/chunk
- Stability: Stable. Combustible. Incompatible with strong oxidizing agents.
- Breaking strength (MPa): 24.5~26.5
- Elongation at break (%): 800~1000
- Rebound rate (%): 50~80
- Compression ratio 100° C. 70 h (%): 2~40
- Maximum use temperature (c): 150
- Embrittlement temperature (c): −35~−42
- Expansion ratio (%): gasoline 10~45; benzene 100~300; acetone 15~50; ethanol 5~20.

Such a material may be formed or manufactured into a closed-cell foam using the manufacturing method of SBR foaming, and the production method of finished products can be by die-cutting.

Any other suitable materials can be used instead or additionally, i.e. materials having properties with comparable properties such as one or more of, but not limited to, Breaking strength, Elongation at break, Compression ratio, Rebound rate and Hermeticity.

In each of the above examples, the first and second sides of the rigid base element define therebetween a thickness of the rigid base element along its central axis.

In each of the above examples, the loop-shaped vacuum seal element is so mounted to second side of the rigid base element that as can be seen in FIGS. 1, 2 and 3, they can be considered as having the following features:

- the protruding portion of the vacuum seal element is disposed within a lateral boundary defined by the peripheral rim of the second side of the rigid base element;
- the protruding portion is disposed closer to the chamber than the peripheral rim of the second side of the rigid element to the central area;
- the contact surface of the protruding portion and the attachment surface of the attachment surface are substantially co-extensive in the radial direction.

Each of the above examples can additionally include any of the features from others of these examples, and can additionally or alternatively include any of the features described below in relation to a further example of the presently disclosed subject matter. For example, the second and third examples can also include air extractor means as set out in the first example, and the air extractor means can be a pump or impeller, and can operate in a steady or variable manner.

Alternatively or additionally, each of the first and third examples can include a bracing structure as set out in the second example. Further, in any of the examples, the bracing structure can be made of a material which is less rigid than that of the base element, can have a loop shape, can be disposed either closer to the central area of the second side than to the peripheral rim thereof, or closer to the peripheral rim of the second side than to the central area thereof, and/or can comprise at least one of rubber, silicone and closed-cell foam.

Alternatively or additionally, the vacuum seal element of the vacuum gripper of each of the first and second examples can comprise a closed-cell foam material. Alternatively or additionally, it can comprise a silicon and/or rubber material.

Alternatively or additionally, any of the first to third examples be a portable or hand-held vacuum gripper, the air extraction means can further comprise a power source, which can comprise a battery pack, at least one of the power source and the pump or impeller can be disposed on the first side of the base element, the vacuum gripper can comprise a handle for holding the vacuum gripper, and/or at least one of the power source and the pump or impeller can be at least partially housed in the handle.

In the vacuum grippers 200, 300 and 400, their vacuum seal elements can be attached to the peripheral area of the second side of their rigid base elements directly or indirectly in any suitable manner.

Figure 4:
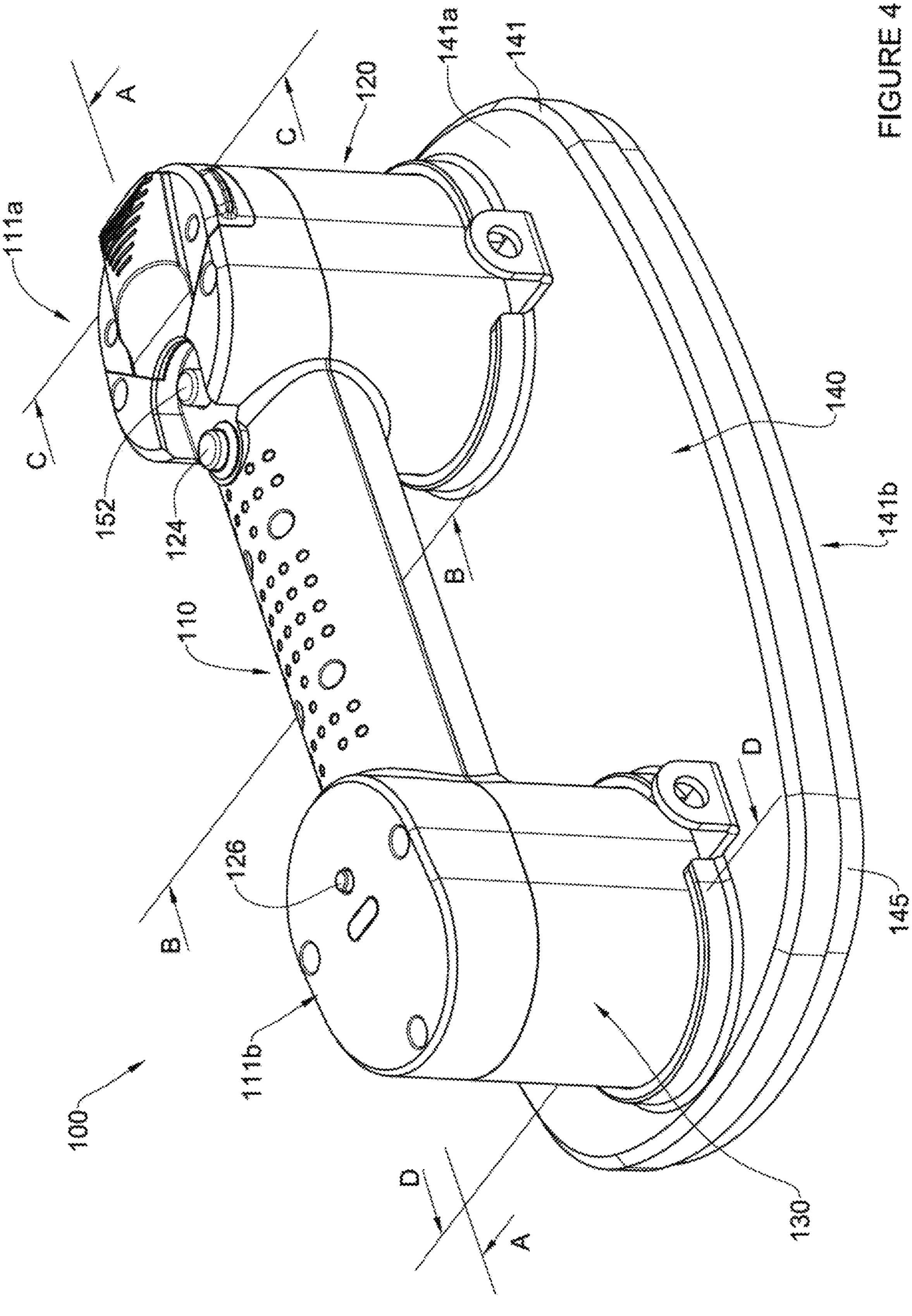
FIG. 4 shows a top perspective view of a vacuum gripper according to a still further example of the presently disclosed subject matter.

FIG. 4 shows a still further example of a vacuum gripper, a vacuum gripper 100. The vacuum gripper 100 comprises a handle portion 110, a power supply portion 120 (see also FIG. 5), a pump portion 130 (see also FIG. 5) and a base portion 140. The handle portion 110 has a first end 111*a* and a second end 111*b*, by which the handle portion 110 is connected or mounted to the base portion 140.

The base portion 140 as seen in FIG. 4 comprises a rigid base element 141 having a first side 141*a* and a second side 141*b* opposite to the first side, and a vacuum seal element 145 held thereby.

The first side of 141*a* of the base element 141 is the same as a first side 140*a* of the base portion 140. The handle portion, power supply portion and pump portion are disposed on the first side 141*a* of the rigid base element 141, and can be mounted thereto either directly or via each other. For example, the power supply portion and the pump portion can be mounted to the first side 141*a* of the base element 141 via the handle portion 110. Such mounting avoids disconnection of components due to any vibrations caused when a pump of the pump portion is in operation.

Handle portion 110 can be a single piece or can comprise multiple pieces. If the handle portion comprises multiple pieces, it can be hollow and so it can be possible to house various components within the handle. Such housings can be joined by screws, bolts, adhesives or snap-fitting arrangements, for example.

The handle can be connected along a single surface or at multiple surfaces to the base portion. The handle can have a wider palm-gripping portion and a narrower finger-gripping portion to allow easy grasping of the handle. Alternatively, the handle can comprise a hole or aperture when connected to the base portion, to allow a hand to grasp around the handle easily. The handle can take an elongate shape for easy grasping. For ease of grasping, the handle can be provided with a textured surfaces, in the form of protrusions and/or recesses, for improved friction with a user's hand.

Figure 6:
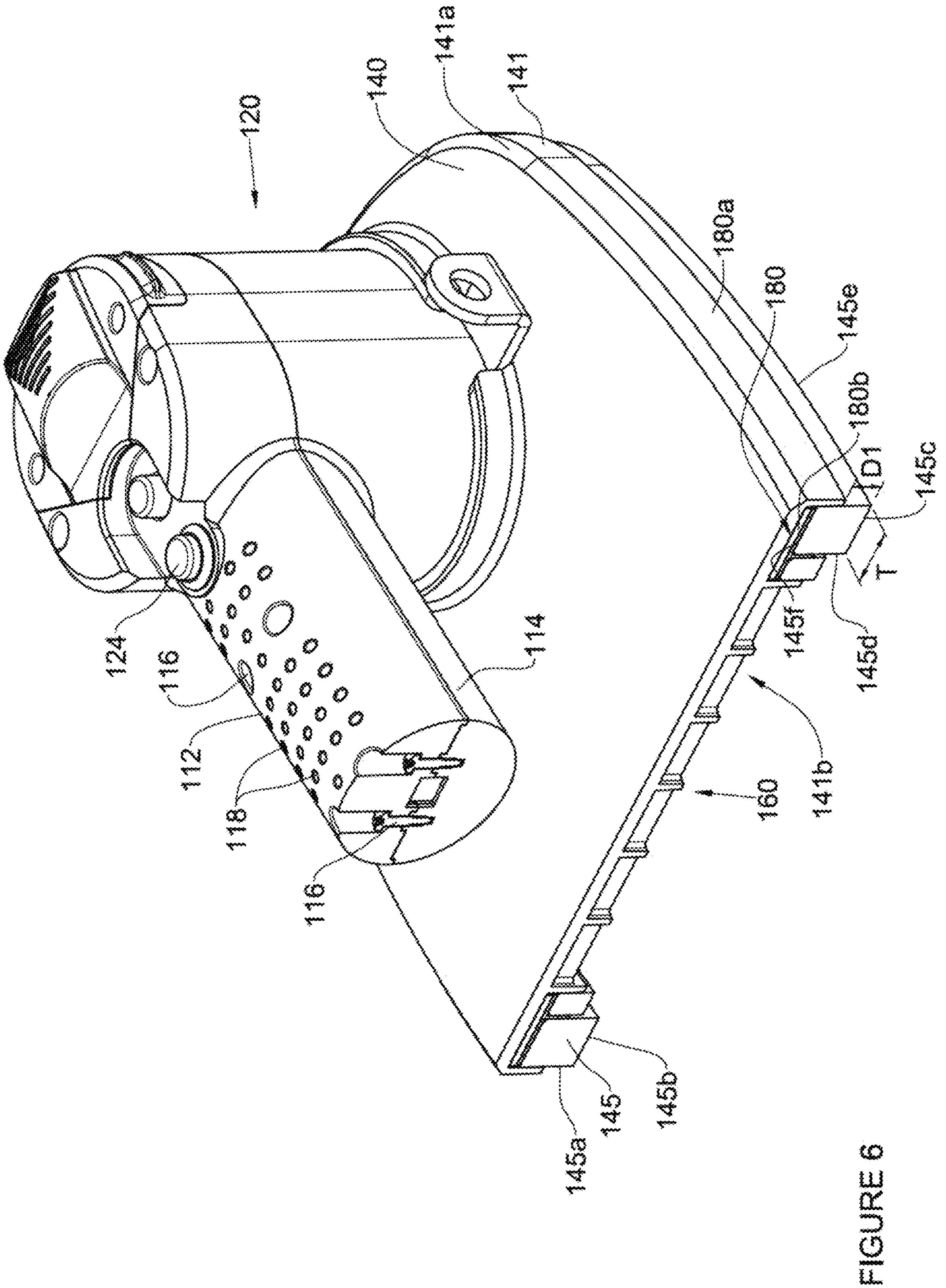
FIG. 6 shows a perspective view of the vacuum gripper shown in FIG. 4, being cut-away along a plane B-B in FIG. 4.

As shown specifically in the vacuum gripper 100, as seen in FIG. 6, the handle portion 110 comprises an upper housing 112 and a lower housing 114, which are joined together by at least one screw or bolt 116. The upper and lower housings 112, 114 are arranged in this example to form an elongate shape, easily capable of being gripped by a user's hand.

In order to provide improved grip in the hand of user, the surface of the upper and lower housings 112, 114 are provided with a multiple recesses 118 (see FIG. 6) arranged in rows and columns.

The power supply portion and the pump portion can be provided separately from the handle portion or can be provided within the handle portion. For example, arrangements are envisioned, whereby the power supply portion and the pump portion are arranged at the same or opposite ends of the handle portion, or one or both are not at either end but rather in the middle of the handle portion. Alternatively, one or both of the power supply portion and the pump portion can be provided within an end of the handle portion, and extending further into the handle portion away from that end.

Figure 5:
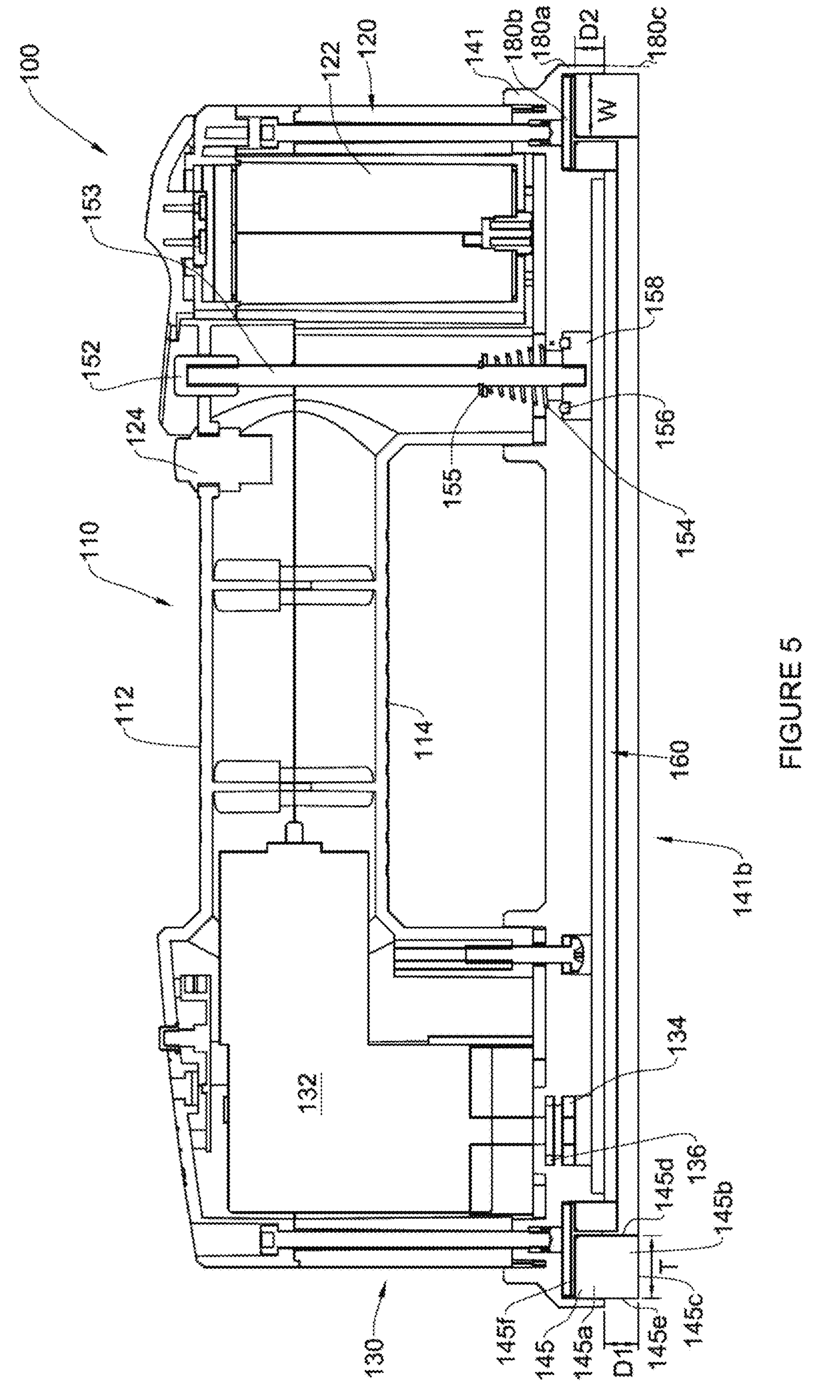
FIG. 5 shows a cross-sectional view of the vacuum gripper shown in FIG. 4, taken along a plane A-A in FIG. 4.

In the vacuum gripper as shown in FIG. 5, the power supply portion 120 is arranged at and within the first end 111*a* of the handle portion 110 and the pump portion 130 is arranged within the second end 111*b* of the handle portion 110, which is the opposite end of the handle portion 110 from the first end 111*a*. The pump portion 130 extends further from the second end 111*b* into the handle portion 110.

The power supply portion is for supplying power to the pump portion, and can be a battery pack. The power supply portion can be electrically connected to the pump portion through the handle, or outside of the handle, for example, along the first surface of the base portion to which the handle is mounted. In the former case, the electrical connection has greater structural integrity as it can be protected from environmental damage.

Figure 7:
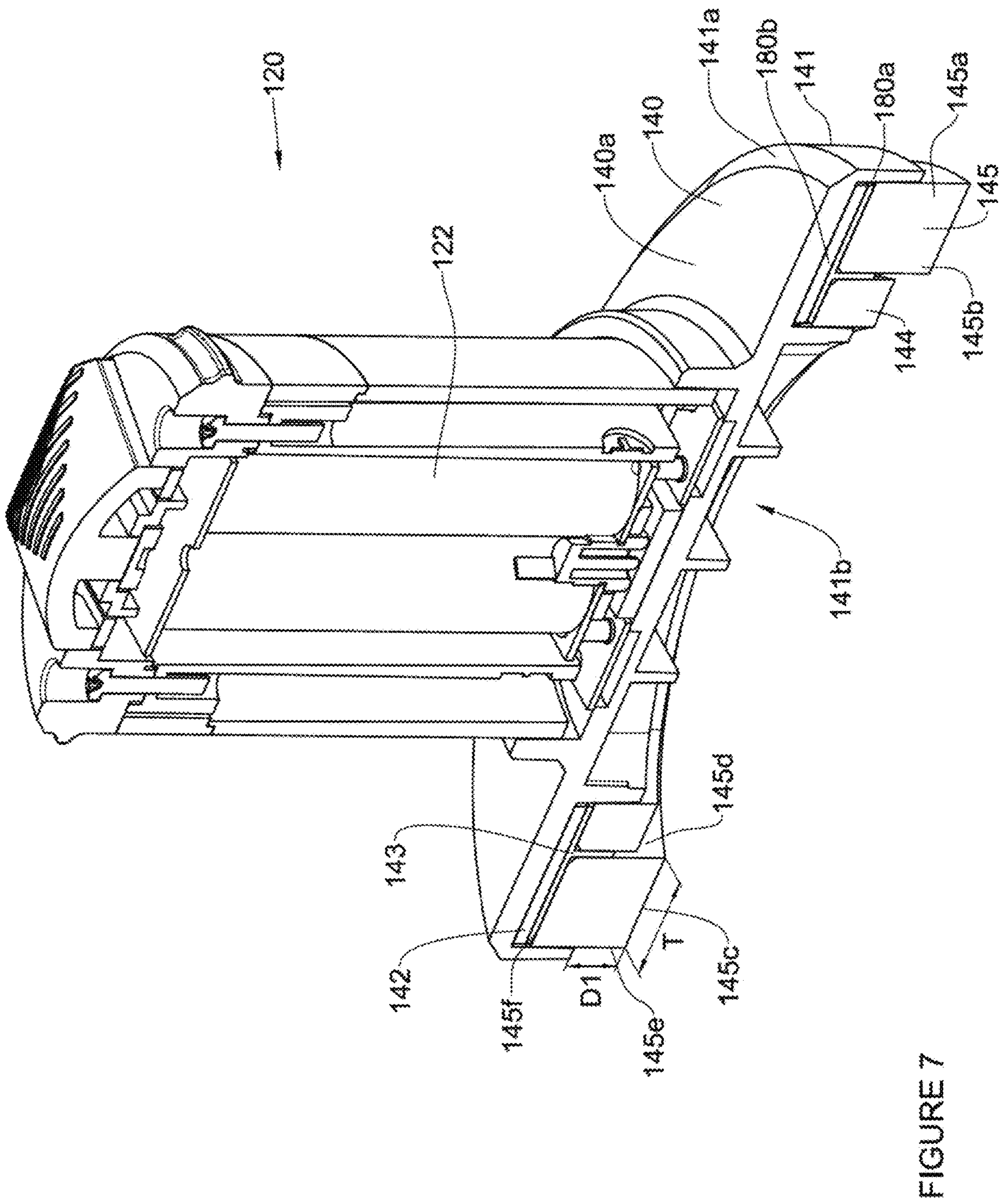
FIG. 7 shows a perspective view of the vacuum gripper shown in FIG. 4, being cut-away along a plane C-C in FIG. 4.

As shown in more detail in FIGS. 5 and 7, the power supply portion 120 comprises a battery or battery pack 122, arranged to supply power to the pump portion 130 of the vacuum gripper 100. The battery pack 122 is electrically connected through the handle portion 110, to the pump portion 130, in order to supply power to the pump portion 130.

Various operating controls can be provided to control the power supplied by the power supply portion to the pump portion. For example various buttons, sliders, control dials for adjusting the power strength, triggers or other devices can be provided. The power operating control can be arranged to remain at the "on" position until a user turns it to "off". This enables the user to retain full functionality of their hands for safely lifting the vacuum gripper. Alternatively, as a safety mechanism, power knob 124 may only be "on" as long as it is depressed by a user, and changes to "off" when released. Such an arrangement ensures safety and power savings when the vacuum gripper is left unattended, and power savings when in use in a situation where no further air extraction is required.

As shown in FIGS. 4, 5 and 6, the battery pack 122 is further electrically connected to a power knob 124 arranged at the first end 111*a* of the handle portion 110*a*. The power knob 124 can be actuated by a user to operate, i.e. turn on and off and vary the power supply to, the pump portion 130. In this case, the power knob 124 is a press-release button, i.e. requires being held down and depressed in order to supply power to the pump portion 130. There is also an ON/OFF button 126 (see FIG. 4) at the second end 111*b* of the handle portion 110, which in the "off" state can allow the battery to be charged, and in the "on" state allows power supply to the pump portion.

The pump portion can comprise a pump, impeller or other air extraction mechanism/device, and as described above can be disposed partly in the handle. The pump is fixedly mounted to the base portion, either directly or via the handle. Such a fixed arrangement provides structural integrity. The pump can comprise a filtering arrangement, such as a filter and filter holder for filtering air passing through the pump to avoid ingress of particulates which could damage the pump, or impair its operation.

Figure 8:
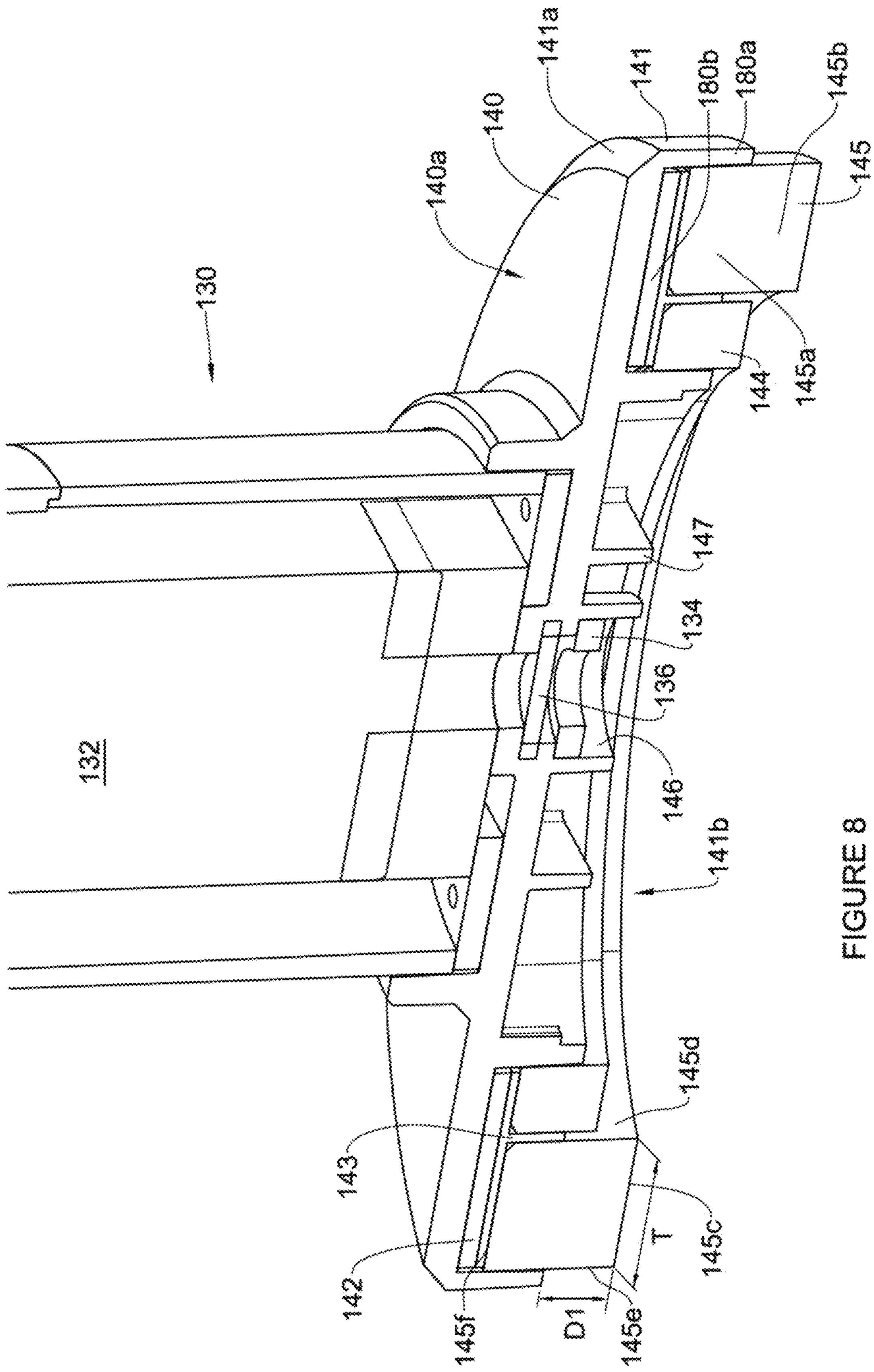
FIG. 8 shows a partial perspective view of the vacuum gripper shown in FIG. 4, being cut-away along a plane D-D in FIG. 4.

As shown in FIGS. 5 and 8, the pump portion 130 comprises a pump 132 disposed partly in the second end 111*b* of the handle portion 110, and partly continuing into the handle portion 110, extending partly through the handle portion 110 in a direction towards the first end 111*a*. The pump 132 is a vacuum pump, i.e. arranged to extract air as will be described further below. The end of the pump 132 disposed towards the first end 111*a* of the handle portion 110 is electrically connected to, and powered by, the battery pack 122 of the power supply portion 120. An opposite end of the pump 132 is disposed in the second end 111*b* of the handle portion 110, separated from the base portion 140 by means of a filter holder 134 arranged to contain a filter 136. The filter 136 is arranged to prevent ingress of particles to the pump 132 during pump operation as air is drawn into and through the pump 132 via the filter 136.

The filter holder 134 and filter 136 are fluidly connected in a sealed manner to a hole 146 passing through the base element 141 from the first side 141*a* of the base element 141 to the second side 141*b* of the base element 141.

As can be seen in FIGS. 5-8, the first and second sides of the rigid base element define therebetween a thickness of the rigid base element along its central axis, and the second side 141*b* of the base element has a central area 160 and a periphery 180 surrounding the central area 160 and bounded by a peripheral rim 180*a* radially spaced thereby from the central area.

The vacuum seal element 145 is attached at an attachment portion 145*a* thereof to a peripheral support area 180*b* constituting a part of the periphery 180 of the second side of the base element 141, and the attachment portion 145*a* has an attachment surface 145*f* in contact with peripheral support area.

The vacuum seal element 145 further comprises a protruding portion 145*b* free of contact with the base element and protruding therefrom in a direction away from the first side 141*a* to a predetermined distance D1. The protruding portion is co-extensive with the attachment portion 145*a* along the peripheral support area 180*b*. The surface of the protruding portion 145*b* of the vacuum seal element 145 which is distal from the second side 141*b* is a contact surface 145*c* for contacting an object surface.

The vacuum seal element 145 further comprises an inner encircling surface 145*d* oriented transversely to and extending from the contact surface 145*c* and partially facing towards the central area 160 so as to define therewith a chamber 170 along the protruding portion 423. The vacuum seal element 145 also comprises an outer encircling surface 145*e* oriented transversely to and extending from the contact surface 145*c* and facing away from the central area 160 and the chamber 170, the peripheral rim 18*a* of the second side of the base element protruding outwardly from the outer encircling surface. Thus, the contact surface 145*c* and the attachment surface 145*f* of the vacuum seal element both extend between the inner and outer encircling surfaces 145*d* and 145*e*, and the contact surface 145*c* is co-extensive with the attachment surface 145*f* along the peripheral support area 180*b* of the second side of the base element.

As seen, the predetermined distance D1, to which the protruding portion 145*a* protrudes from the second side of the rigid base element, does not exceed a thickness T of the protruding portion between the inner and outer encircling surfaces. More particularly, the thickness T of the protruding portion is greater than the predetermined distance D1.

The vacuum seal element is disposed closer to a peripheral rim 180*a* of the second side 141*b* than the central area 160 of the second side 141*b*, and has a loop shape. By loop shape, what is meant is that the vacuum seal element sealingly encircles the chamber 170. The loop-shape can be an annulus, i.e. circular, or can comprise any other shaped circuitous structure, i.e. a closed boundary, e.g. an elliptical shape.

In each of the above examples, the loop-shaped vacuum seal element is so mounted to second side of the rigid base element that as can be seen in FIGS. 1, 2 and 3, they can be considered as having the following features:

- the protruding portion of the vacuum seal element is disposed within a lateral boundary defined by the peripheral rim of the second side of the rigid base element;
- the protruding portion is disposed closer to the chamber than the peripheral rim of the second side of the rigid element to the central area;
- the contact surface of the protruding portion and the attachment surface of the attachment surface are substantially co-extensive in the radial direction.

The vacuum seal element 145 with its attachment portion 145*a* mounted to the of the peripheral support area 180*b* of the second side 141*b* of the rigid base element can be considered as constituting with this area (and any other elements used for such mounting as described in detail below) a vacuum seal assembly, and as can be seen in FIGS. 5-8, this assembly has each of the following features:

- the protruding portion of the vacuum seal element is disposed within a lateral boundary of the assembly defined by the peripheral rim of the second side of the rigid base element (this boundary is shown in dotted line and designated as 180*c* in FIG. 5); and
- the assembly comprises a channel 180*d* (FIG. 5) receiving the attachment portion 145*b* and conforming thereto in shape, i.e. the channel has a width corresponding to the thickness of the attachment portion and a depth of the channel corresponding to a height of the attachment portion along its inner and outer encircling surfaces (these width and depth are designated in FIG. 5 as W and D2 respectively); in this particular example the width exceeds the depth.

The base portion 140 can comprise further structural components e.g. at the second side of the rigid element, such as a seal structure element for giving support to the vacuum seal element 145, a leakage seal element for ensuring a seal between the base element 141 and the seal structure element, and a bracing structure for providing structural integrity to the vacuum seal element 145.

Figure 9:
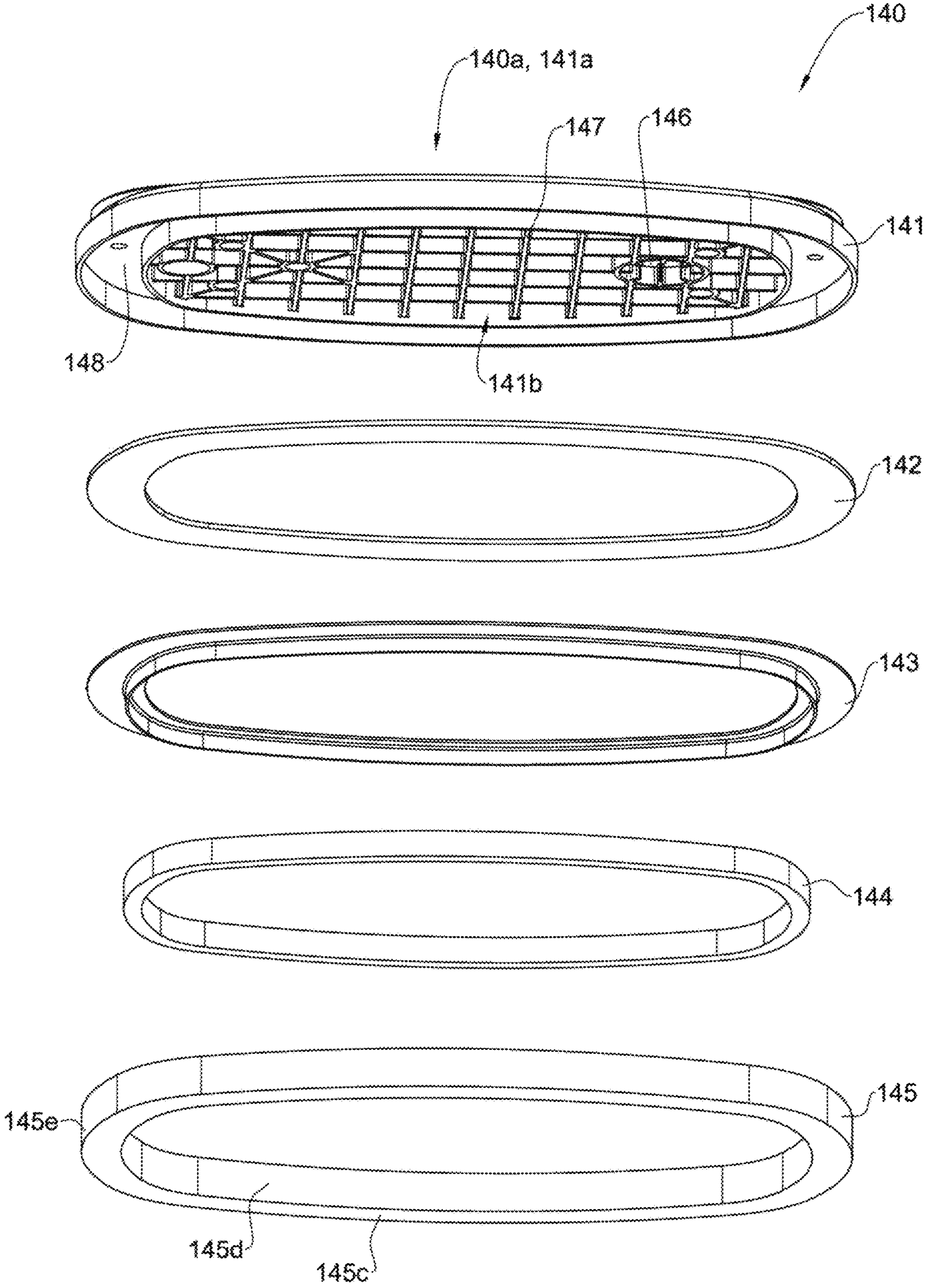
FIG. 9 shows an exploded perspective view of components of a base portion of the vacuum gripper shown in FIG. 4.

In the particular example as shown in the exploded view of FIG. 9, and as visible in the cross sections shown in FIGS. 7 and 8, the base portion 140 is of generally elliptical shape and comprises, apart from the rigid base element 141 and the vacuum seal element 145, also a leakage seal element 142, a seal structure element 143, and a bracing structure 144. The rigid base element 141 provides a supportive structure, and the ends 111*a*, 111*b* of the handle portion 110 are attached to the first side 141*a* of the base element 141 in the manner described above. Additionally, at least some of the components of the power supply portion 120 and the pump portion 130 can be securely fixed to the base element 141, to avoid disconnection of components due to any vibrations caused when the pump 132 is in operation.

The base element can be formed by injection molding or casting, and can comprise a polymer, plastic or a metal. The base element can be provided at its underside with a number of ribs to provide more strength and structure to the base element which will be put under high loads when a vacuum is formed adjacent thereto, as will be described in more detail below. The base element can also comprise a number of holes passing therethrough in order to allow passage of bolts or other fixing members which can provide a secure mounting connections between the base element and the ends of the handle portion, the pump portion and/or the power supply portion. The arrangement of ribs will vary depending on the particular arrangement of components, connections, and the dimensions of each structural member.

As shown in the example, as depicted in FIG. 9, various ribs 147 are shown on the second side 141*b* of the base element 141 and various holes are shown as passing through the base element from the second side 141*b* to the first side 141*a*.

Various other structural arrangements can be provided to retain and/or support the various components of the base portion. For example, various clips, channels or tracks can be provided on the second side of the base element to securely hold the vacuum seal element and any or all other components of the base portion in place.

As shown in FIG. 9 in this particular example, the base element 141 comprises an elliptical track 148 at its second side 141*b*, open in a direction away from the first side 141*a*, having track sides for supporting the various components of the seal. The leakage seal element 142 is disposed entirely within the track 148, between (and adjacent to) the base element 141 and the seal structure element 143, creating a fluid-impervious seal between the base element 141 and the seal structure element 143.

The seal structure element 143 comprises an elliptical looped structure having a T-shaped radial cross-section. The top of the "T-shape" contacts and lies parallel to the leakage seal element 142, while the leg of the "T-shape" extends transverse to the leakage seal element 142. Thus two channels, each having an elliptical loop shape, are formed within the track 148. Each channel is bounded by one of the track sides and one respective side of the leg of the "T-shape". The two channels are open in a direction away from the second side 141*b* and are concentric, i.e. there is an inner channel and an outer channel. The bracing structure 144 is fixed in the inner channel and the vacuum seal element 145 is fixed in the outer channel.

The bracing structure is arranged to prevent over-compression or over-deformation of the vacuum seal element. Thus, for example, the bracing structure can be stiffer or more rigid than the vacuum seal element. In other words, the bracing structure comprises a material which is relatively much more stiff or rigid, and less easily deformable than the vacuum seal element. Exemplary materials for the bracing structure include, but are not limited to, silicone, rubber, and/or a relatively stiff closed-cell foam, while exemplary materials for the vacuum seal element include, but are not limited to, silicone, rubber and/or closed-cell foams. It is to be understood that where similar materials are chosen for each of the bracing structure and the vacuum seal element, a stiffer, more rigid form of the material should be provided for the former and a more deformable, less rigid form of the material should be provided for the latter.

The bracing structure protrudes from the second side of the base element to a lesser extent than the vacuum seal element. The bracing structure can comprise a loop-shape arranged either concentrically within or concentrically outside the vacuum seal element. Alternatively, the bracing structure can comprise one or more extended intermittent supportive elements, such as curved or straight portions extending along the vacuum seal element, or even multiple support pillars spaced along, i.e. extending along, the vacuum seal element, to enable support to be provided at multiple points around and along the loop-shaped vacuum seal element.

In the specific example shown in FIG. 8 for example, the bracing structure 144 protrudes by a smaller amount out of the channel than the outer vacuum seal element 145. Therefore, if the contact surface of the vacuum seal element 144 is brought into contact with an object surface, for example a textured panel to be lifted, the vacuum seal element 145 will contact the object surface, and the bracing structure 144 will be spaced apart, i.e. offset, from the object surface. In this manner, the chamber defined by the encircling surface and the second side 141*b* of the base element 141 becomes enclosed as it is additionally bounded by the object surface.

Upon activation of, i.e. supply of power to, the pump 132 (when the vacuum gripper 100 is switched on by actuating (depressing) the power knob 124 and turning "on" the ON/OFF button 126), air is drawn from chamber via the hole 146 passing through the base element 141, through the filter 136, through the pump 132 and out of the vacuum gripper 100. If the contact surface of the vacuum seal element 144 has been brought into contact with an object surface, the chamber will be enclosed. Consequently, when the pump 132 is activated, the air pressure in the enclosed chamber reduces relative to the ambient air pressure outside of the chamber, so that the vacuum gripper 100 and the object surface are urged closer together.

As this urging force increases with decreasing pressure in the enclosed chamber, the contact surface of the vacuum seal element 145 will begin to deform and compress in such a manner as to bring the vacuum gripper 100 and the object surface closer together, and cause the contact surface of the vacuum seal element 145 to adapt its shape to more closely conform with the texture of the object surface.

As the vacuum gripper 100 and the object surface come closer together and are brought into closer conformity with one another, a better seal is created, reducing undesirable ingress of air, via gaps between the vacuum seal element 145 and the object surface, into the enclosed chamber. This creates a more effective vacuum and therefore stronger urging of the vacuum gripper 100 and the object surface towards one another.

Over-compression of the vacuum seal element 145 can be problematic, as it can damage the vacuum seal element 145 by moving from elastic deformation to plastic deformation. Consequently, this could lead to reduced effectiveness of the vacuum seal element 145 and thus less effective grip.

The bracing structure 144 helps to prevent over-compression of the vacuum seal element 145 as follows. As the vacuum gripper 100 and the object surface come closer together, the offset or space between the bracing structure 144 and the object surface, due to the relative protrusion distances of the bracing structure 144 and the contact surface of the vacuum seal element 145 from the second side 141*b* of the base element 141, is reduced. At a certain compression threshold, at least some of the vacuum seal element 145 or the contact surface thereof will have been compressed to effectively protrude by the same amount as the bracing structure, and so the bracing structure 144 will contact the object surface. Since the bracing structure 144 is less easily deformable than the vacuum seal element 145, the bracing structure will resist and withstand further urging forces caused by the vacuum and thus prevent further significant compression, i.e. over-compression, of the vacuum seal element 145.

An alternative to the above is an arrangement comprising use of only a vacuum seal element, having a material and shape chosen such as to be deformable but to resist over-deformation, allowing the vacuum gripper 100 to conform with the external surface, while avoiding over-compression due to innate material stiffness.

In each case, since the vacuum gripper 100 has a vacuum seal element with a contact surface capable of conforming to an object surface, an effective vacuum can easily be formed and so a smaller, i.e. more energy efficient pump can be used. For example, a pump can have a working voltage of 9-14 V DC, a vacuum degree of 80 kPa, a rated flow of 20 L/min, a rated power of 16 W, and a rated voltage of 12 V DC. Since the pump is smaller and consumes less energy, a smaller power supply is required. Thus both the pump portion 130 and the power supply portion 120 can be small and light, increasing the portability and ease of use of the vacuum gripper, particularly when using the vacuum gripper to support and lift objects which are themselves heavy.

Furthermore, energy efficiency can also be improved by operating the pump in a variable manner, for example by reducing the power supplied to the pump to a level sufficient to maintain the vacuum grip on an object, without unnecessarily reducing the pressure in the chamber to a stronger vacuum. In this way, power savings can be achieved, as the vacuum gripper is more adaptable to different gripping situations.

The vacuum gripper can be used on a variety of surfaces, including smooth and textured surfaces. This is because the deformability of the contact surface of the vacuum seal element 145 of the vacuum gripper 100 allows conformity of the vacuum gripper 100 with the surface of an object to be carried, thereby ensuring a sufficient vacuum can be achieved, even when the external surface can be textured, i.e. it is not a smooth surface.

By vacuum, what is meant is that an ultimate pressure in the enclosed chamber is substantially below atmospheric pressure. For example, having a pressure in the range of 50-80 kPa.

The vacuum gripper 100 can be used to pick up, support, hold, place and release items such as boxes, pieces of furniture, panels and other heavy, bulky, fragile or difficult to grip items. When the user desires to release the item from the grip of the vacuum gripper, a simple release mechanism can be provided which causes a gap in one of the surfaces of the enclosed chamber, allowing ingress of air, causing loss of vacuum, loss of grip and separation of the vacuum gripper 100 and the external surface of the item.

Figure 10:
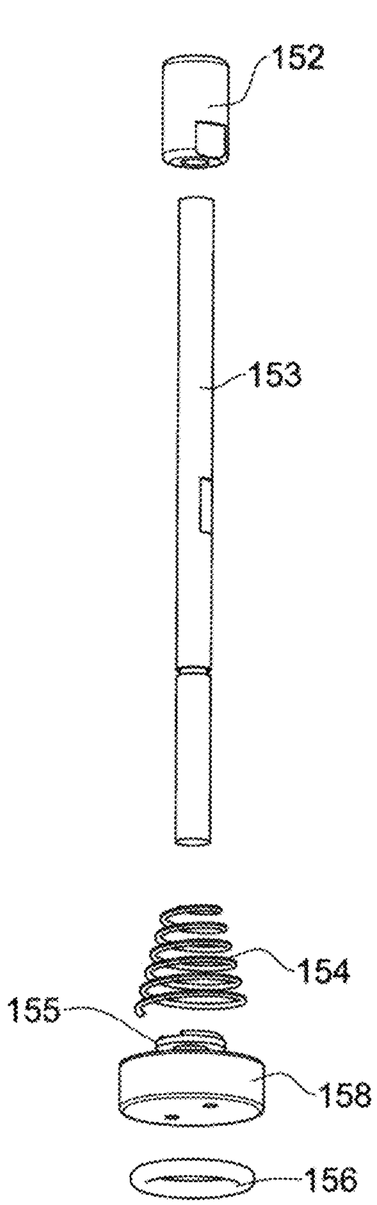
FIG. 10 shows an exploded perspective view of components of a vacuum release mechanism.

In the example shown in FIG. 4 and more specifically in FIGS. 5 and 10, the mechanical release is provided in the form of release mechanism 150, having release button 152 provided at the first end 111*a* of the handle portion 110. Release button 152 is connected via a shaft 153 to a blocking component 158 located at the second side 141*b* of the base element 141 via a hole in the base element 141. A surface of the blocking component 158 which faces the second side 141*b* of the base element 141 comprises an annular channel into which an O-ring or other sealing component is placed. The O-ring or sealing component has a larger diameter than, and surrounds, the outer circumference of the hole in the base element 141 through which the shaft 153 passes. A compression spring 154 urges at one end against a circlip 155 on the shaft 153 and at the other against the upper surface of the main base element 141, i.e. against the upper surface 140*a* of the base portion 140. This causes the blocking component 158 to be biased and pulled upwards and compress the O-ring or sealing component between the blocking element 158 and the second side 141*b* of the base element 141. This creates an effective airtight seal against air leakage into the enclosed chamber when a vacuum is in place.

In the event that the user wishes to release the gripped item, the user can first release the press-release power knob 124 and/or turning "off" the ON/OFF button 126 to turn off the supply of power to the pump portion 130. This will enable easier release once an attempt to separate the item from the vacuum gripper 100 is made. The user can then depress the release button 152. This urges the shaft 153 downwards against the biasing force of the spring 153 and pushes the blocking element 158 and the O-ring or sealing component away from the underside of the main base element 141, to allow ingress of air into the enclosed chamber. The pressure in the enclosed chamber increases to atmospheric pressure and the vacuum gripper 100 can simply be lifted away and removed from the external surface of the item.

Since both the power button 126 and the release button 152 are conveniently placed next to each other at the first end 111*a* of the handle portion 110, a user can simply and easily use a single digit, e.g. a thumb or forefinger, to press each button in succession to release the vacuum gripper 100 from the external surface of the item.

Although the above described examples are in relation to a hand-held vacuum gripper, it is also envisaged that a vacuum gripper can be connected to the end of a robotic arm. In such embodiments, the vacuum gripper may not have a handle portion as described above, and the pump portion can be arranged on the first side of the base element, either directly mounted thereon or mounted at a distance, for example within the robotic arm. The power supply portion may be in the form of stored power, i.e. may be a battery, and/or may be a mains connection via wires or other conductive components passing along and/or through the robot arm.

In such robotic arms, there may not be an on-off knob on the vacuum gripper, but rather, power supply to the vacuum gripper can be remotely controlled by a human or computer operator.

The strength of the vacuum provided by the vacuum gripper can be sufficient to enable lifting of an object to which the vacuum gripper is attached.

What is claimed is:

1. A vacuum gripper for gripping an object surface, the vacuum gripper comprising:

a base element having a first side and a second side opposite to the first side, the second side having a central area and a periphery surrounding the central area, wherein said periphery of the second side of the base element is bounded by a peripheral rim and comprises a peripheral support area;

a seal element having an attachment surface mounted to the peripheral support area and a contact surface opposite to the attachment surface;

an air extraction mechanism mounted to the first side of the base element so as to be in fluid communication with a chamber defined by the second side and the seal element and configured to extract air from the chamber; and a bracing structure arranged within or outside the seal element;

wherein the seal element protrudes a distance from the peripheral support area no greater than a thickness of the seal element; and brackets at the first side of the base element, each bracket having two mutually transverse portions, a first one of said portions extending along the first side of the base element, and a second one of said portions being attached to the first portion and extending transverse to the first portion away from the first side of the base element, the second one of said portions comprising a through-hole.

2. The vacuum gripper according to claim 1, further comprising a handle for holding the vacuum gripper at the first side of the base element, the handle comprising two handle mounting portions connected to the first side of the base element at two spaced apart locations, the brackets being provided between the handle mounting portions and the first side of the base element.

3. The vacuum gripper according to claim 2, wherein the first one of said mutually transverse portions of each bracket extends away from the respective handle mounting portion, and the second one of said mutually transverse portion of each bracket extends transverse to the first portion along the respective handle mounting portion.

4. A vacuum gripper for gripping an object surface, the vacuum gripper comprising:

a base element having a first side and a second side opposite to the first side, the second side having a central area and a periphery surrounding the central area, wherein said periphery of the second side of the base element is bounded by a peripheral rim and comprises a peripheral support area;

a seal element having an attachment surface mounted to the peripheral support area and a contact surface opposite to the attachment surface;

an air extraction mechanism mounted to the first side of the base element so as to be in fluid communication with a chamber defined by the second side and the seal element and configured to extract air from the chamber; and a plurality of ribs arranged across the second side to provide strength and structure to the base element;

wherein the seal element protrudes a distance from the peripheral support area no greater than a thickness of the seal element; and brackets at the first side of the base element, each bracket having two mutually transverse portions, a first one of said portions extending along the first side of the base element, and a second one of said portions being attached to the first portion and extending transverse to the first portion away from the first side of the base element, the second one of said portions comprising a through-hole.

5. The vacuum gripper according to claim 4, further comprising a handle for holding the vacuum gripper at the first side of the base element, the handle comprising two handle mounting portions connected to the first side of the base element at two spaced apart locations, the brackets being provided between the handle mounting portions and the first side of the base element.

6. The vacuum gripper according to claim 5, wherein the first one of said mutually transverse portions of each bracket extends away from the respective handle mounting portion, and the second one of said mutually transverse portion of each bracket extends transverse to the first portion along the respective handle mounting portion.

* * * * *